(12) United States Patent
Trudeau

(10) Patent No.: US 7,289,683 B2
(45) Date of Patent: Oct. 30, 2007

(54) SYSTEM AND METHOD FOR SCINTILLATION SUPPRESSION IN INTENSIFIED DIGITAL VIDEO

(75) Inventor: Tim K. Trudeau, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 644 days.

(21) Appl. No.: 10/697,198

(22) Filed: Oct. 30, 2003

(65) Prior Publication Data
US 2005/0094888 A1   May 5, 2005

(51) Int. Cl.
G06K 9/40 (2006.01)

(52) U.S. Cl. .................... 382/274; 382/260; 345/20

(58) Field of Classification Search ............. 382/274, 382/260, 132, 265; 345/20; 348/251
See application file for complete search history.

(56) References Cited

U.S. PATENT DOCUMENTS

| | | | | |
|---|---|---|---|---|
| 3,937,878 A | * | 2/1976 | Judice | 348/798 |
| 3,959,583 A | * | 5/1976 | Judice et al. | 348/798 |
| 4,298,944 A | * | 11/1981 | Stoub et al. | 382/274 |
| 5,254,982 A | * | 10/1993 | Feigenblatt et al. | 345/690 |
| 6,101,287 A | * | 8/2000 | Corum et al. | 382/274 |
| 6,243,504 B1 | * | 6/2001 | Kruppa | 382/318 |
| 6,707,493 B1 | * | 3/2004 | Lee et al. | 348/246 |
| 6,747,697 B1 | * | 6/2004 | Lin et al. | 348/246 |
| 6,898,331 B2 | * | 5/2005 | Tiana | 382/274 |

FOREIGN PATENT DOCUMENTS

JP        01307886 A  * 12/1989

OTHER PUBLICATIONS

Jodice, C. —"Digital Video: A Buffer-Controlled Dither Processor for Animated Images"—IEEE Transactions on Communications — vol. COM-25, No. 11, pp. 1433-1440, Nov. 1977.*
Yuval Boger and Moshe Tur, "Simple Real-Time Noise Removal In Intensified Low-Light-Level Television Images", Applied Optics, vol. 31, No. 17, Jun. 10, 1992.

* cited by examiner

Primary Examiner—Jingge Wu
Assistant Examiner—Bernard Krasnic
(74) Attorney, Agent, or Firm—RatnerPrestia

(57) ABSTRACT

A method for scintillation suppression of video images includes receiving a frame of pixels having intensity values and identifying pixels in the received frame having scintillation noise. The method modifies intensity values of pixels in the received frame, which are identified as having scintillation noise, and forms a filtered frame of pixels. The method counts the number of pixels modified in the filtered frame of pixels, and displays the filtered frame of pixels if the amount of pixels counted is less than a threshold value. The method displays the received frame of pixels, if the amount of modified pixels counted in the filtered frame of pixels is greater than the threshold value.

19 Claims, 3 Drawing Sheets

SYSTEM AND METHOD FOR SCINTILLATION SUPPRESSION IN INTENSIFIED DIGITAL VIDEO

TECHNICAL FIELD

The present invention relates, in general, to imaging devices and, more specifically, to a system and method for suppression of scintillation noise from digital data produced by an intensified video camera.

BACKGROUND OF THE INVENTION

Image intensification devices are constructed for a variety of applications. These devices are particularly useful for both industrial and military applications. For example, image intensification devices are used in night vision goggles for enhancing the night vision of aviators and other military personnel performing covert operations. They are also employed in security cameras, photographing astronomical bodies and in medical instruments to help alleviate conditions such as retinitis pigmentosis, more commonly known as night blindness. Image intensification devices are currently manufactured in two types, commonly referred to as Generation II (GEN 2) and Generation III (GEN 3) type image intensifier ($I^2$) tubes.

Image intensifier tubes inherently produce a type of noise known as scintillation noise. Scintillation appears as a random bright flash of very short duration in the output of the $I^2$ tube. In GEN III tubes, the flashes are typically 30 microns in size and persist for 1 to 3 milliseconds. A digital video camera mounted to an $I^2$ tube captures scintillation as one or more bright pixels. The camera exacerbates scintillation noise by extending the duration of each flash from several milliseconds to a full camera frame period. Scintillation noise suppression, therefore, is especially desirable in intensified video.

In an article, titled "Simple real-time noise removal in intensified low-light-level television images" by Boger and Tur, published 10 Jun. 1992 in Applied Optics, Vol. 31, No. 17, at pages 3196-3198, a method is described for removing scintillation noise using an operator to reduce noisy scintillations. The operator uses, as referred to by the authors, a pixelwise interframe temporal minimum operator. Temporal image averaging techniques are described. Some improvements result from the operator, but undesirable blurring of images also result, especially in situations of moving images.

The present invention addresses an improved system and method for scintillation suppression of video images.

SUMMARY OF THE INVENTION

To meet this and other needs, and in view of its purposes, the present invention provides a method for scintillation suppression of video images including the steps of: (a) receiving a frame of pixels having intensity values; (b) identifying pixels in the received frame having scintillation noise; (c) modifying intensity values of pixels in the received frame, identified as having scintillation noise, to form a filtered frame of pixels; (d) counting the number of pixels modified in step (c); and (e) displaying the filtered frame of pixels, if the amount of pixels counted is less than a threshold value. The method of the invention may also include receiving previous and present frames of pixels, wherein step (c) includes storing a previously filtered frame of pixels in a buffer, and modifying intensity values of pixels in a presently received frame of pixels by using a previously filtered frame of pixels stored in the buffer.

In another embodiment, the invention includes a system for scintillation suppression. The system has a receiver for receiving a frame of pixels having intensity values, and a processor, coupled to the receiver. The processor is configured to (a) identify pixels in the received frame having scintillation noise, and (b) modify intensity values of pixels in the received frame identified as having scintillation noise, to form a filtered frame of pixels. A counter is included in the processor, for counting the number of pixels modified by the processor, and a display is included for displaying the filtered frame of pixels formed by the processor. The display displays the filtered frame of pixels, if the amount of pixels counted by the counter is less than a threshold value.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawings.

DETAILED DESCRIPTION OF THE INVENTION

As will be explained, the present invention suppresses scintillation noise using a video processor, which may be bandwidth and memory limited. In addition, the present invention is both computationally simple and may be implemented with a frame buffer having a storage capacity to hold data of a single video frame.

Figure 1:
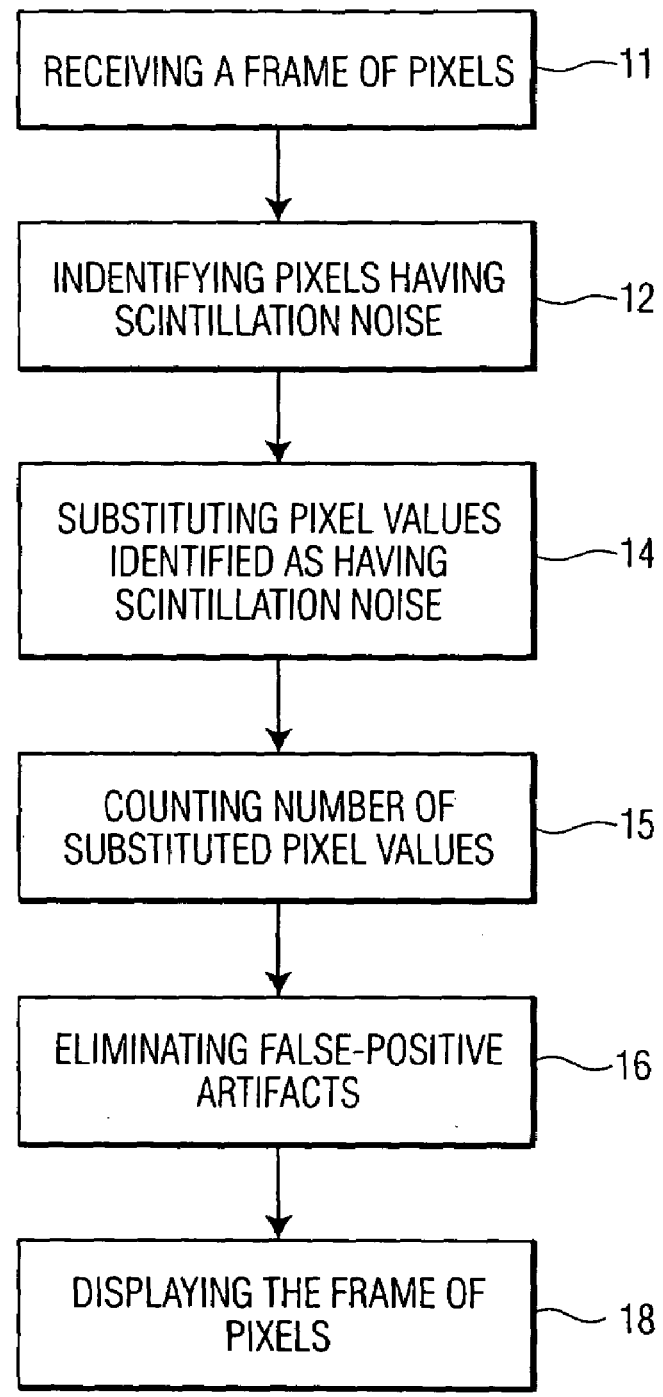
FIG. 1 is a flow diagram illustrating a method for suppressing noise scintillation in a received frame of pixels, in accordance with an embodiment of the invention.

Referring to FIG. 1, there is shown a method for suppressing noise scintillation, in accordance with an embodiment of the invention. The method, generally designated as 10, includes step 11 for receiving a frame of pixels and step 12 for identifying pixels having a high probability of containing scintillation noise. Also included are step 14 for substituting the scintillation noise value of a pixel with a value close to that of what the camera would have recorded absent the scintillation noise, and step 15 for counting the number of substituted pixel values. As will be explained, step 16 effectively eliminates persistent false-positive artifacts occurring as a side effect of pixel substitution, by using the count number provided by a counter performing the counting in step 15. The modified frame may be displayed, in step 18, on a display.

The step of identifying pixels that have a high probability of containing scintillation noise may be performed by comparing each new pixel, in real time, as the pixel is received from the camera, with the same spatially located pixel from the previous frame. The next step, value substitution, may be performed by replacing the current pixel value with that of the value of the same spatially located pixel from the previous frame.

It will be appreciated that steps 12 and 14 are effective when the video scene content is not highly dynamic. There are conventional algorithms available that minimize scene dynamics in digital video. An example of such algorithm is motion stabilization, which minimizes the effect of camera motion. The inventor, however, has discovered that even with such algorithms, the use of pixel substitution to remove noise may induce false-positive artifacts in the filtered scene. These artifacts may occur at image locations where pixels abruptly change from dim to bright and remain bright. If the change in pixel brightness meets a criteria for substitution, the bright pixel may be replaced with a dim pixel and the cycle may repeat indefinitely. As will be explained, step 16 of the method of the invention eliminates these false-positive artifacts.

Camera systems having enough memory and memory bandwidth may buffer two or more frames and, thus, avoid false-positive artifact problems by evaluating changes in a pixel's brightness over multiple samples. For camera is systems which buffer only a single frame, the present invention advantageously detects and corrects false-positive artifacts. Step 16 of method 10 accomplishes this by monitoring the number of scintillation pixels that are substituted on a frame-by-frame basis. If the substitution count exceeds a threshold, then all pixel substitutions are suspended for one frame. This allows the unfiltered value of every pixel to be placed into a single video buffer, and breaks the cycle of persistent false-positives.

The present invention also advantageously minimizes the number of persistent false-positive artifacts by limiting the amount of scintillation suppression performed in situations having highly dynamic scenes. As will be explained, a threshold may be set by a user that trades off scintillation noise for artifact noise. An algorithm for accomplishing these steps is described later.

Figure 2A:
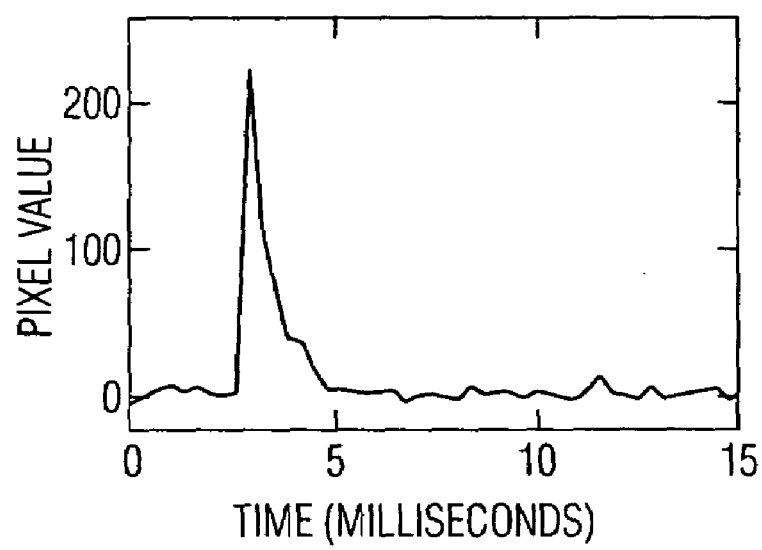
FIG. 2a is a graph illustrating an example of scintillation noise in a pixel, showing intensity value of the pixel as a function of time.
Figure 2B:
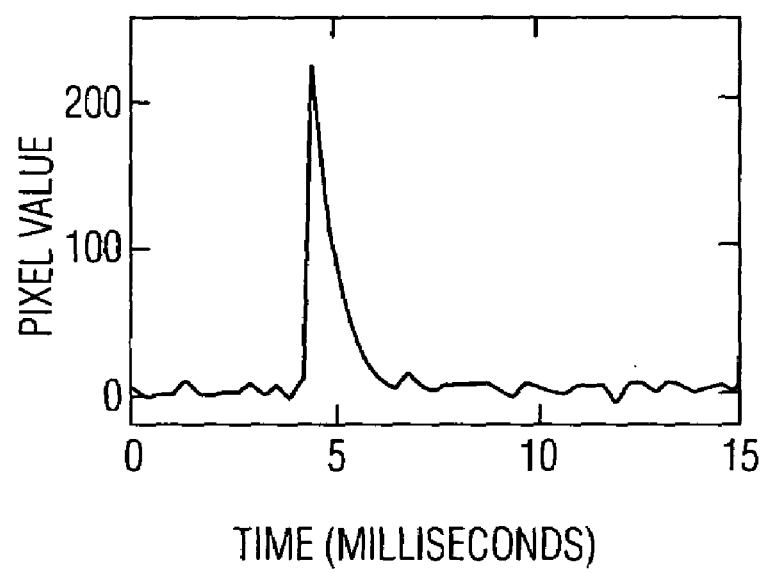
FIG. 2b is a graph illustrating another example of scintillation noise in a pixel, showing intensity value of the pixel as a function of time.

As examples, two typical scintillation noise spikes are shown in FIGS. 2a and 2b. As shown, amplitude, or intensity, is plotted versus time. These plots were obtained from a GEN III tube at a sampling rate of 3129 samples per second. Intensity is scaled using eight bits, thus, obtaining a range of 0 to 255.

The intensity of each noise spike, respectively shown in FIGS. 2a and 2b, approaches the maximum detector value of 255, i.e. saturation. The duration of the spikes are approximately 2.5 milliseconds (ms). The short duration and high intensity of the noise spike are identified by the invention as scintillation noise. On average, the scintillation noise appears bright against a normal video signal. If the minimum detection threshold for a scintillation pixel is set at a value of 127 (for example), the duration of the noise above this threshold is even shorter, or approximately 1 ms, as shown.

In the above examples, the digital video content of an exemplary embodiment of the present invention is an eight-bit gray scale from a camera with a resolution of 1024×1280 pixels, mounted to a GEN III image intensifier (I²) tube. It will be understood that the invention is not limited to this video format, but may be applied to any digital video stream, at any camera resolution, and to any pixel-encoding format, either black and white or color.

Generally, a digital video camera exposes each pixel once per frame. In addition, each scintillation noise typically appears for only one frame in video cameras with frame rates below 500 frames per second. For example, a camera with a 30 Hz frame rate samples any pixel once every 33.3 ms. In solid-state imagers, the exposure time for any pixel is approximately the frame period divided by the number of video lines. A camera with a frame rate of 30 Hz and a vertical resolution of 1024 lines, therefore, exposes each pixel for about 32.5 microseconds once every 33.3 milliseconds. Since both the period of exposure and the duration of the noise spike are small compared to the exposure time, it is unlikely for any given scintillation event to appear in more than one video frame. In addition, the value of a pixel exposed to scintillation noise is the sum of the scintillation intensity and the normal image intensity at that pixel location. In this manner, the invention effectively identifies, with high probability, a pixel that contains scintillation noise. Such a pixel has a value higher than the value obtained from the previous frame, at the same pixel location, for a duration of one frame.

In operation, the invention tests for scintillation noise by subtracting, on a pixel-by-pixel basis, the previous frame from the current frame. Subtractions that produce a positive result identify pixels that may contain scintillation noise. These pixels are then subjected to two additional tests in order to reduce the probability of a false-positive. First, since scintillation tends to produce bright pixels, the magnitude of the subtraction is tested against a threshold value. Results having a magnitude greater than the threshold value identify pixels that have a high probability of containing scintillation noise. Second, an individual pixel only becomes noticeable to a viewer as noise, when it is relatively bright within the local scene. The contribution from a scintillation event may be anywhere from zero to saturation. Only when this contribution causes a pixel to appear bright, however, is that pixel a candidate for substitution. This second test uses a second threshold value which identifies bright pixels.

A mathematical form of the two test described above may be given by the following equation (Equation 1):

$$S_{p,f} = (V_{p,f} > A) \char`\^ ((V_{p,f} - V'_{p,f-1}) > 0) \char`\^ (|V_{p,f} - V'_{p,f-1}| > B) \quad \text{where}$$

$V_{p,f}$ is the value of pixel p received from the camera during frame f $V'_{p,f}$ is the stored value of pixel p from frame f.

A is the threshold for bright pixels.

B is the threshold by which pixel(p,f) and pixel(p,f-1) are to differ.

$S_{p,f}$ is true when pixel(p,f) meets the criteria for pixel substitution.

^ is a logical "and"

The values of A and B may be dynamically adjusted from frame to frame. An algorithm may be used to optimize the values of A and/or B based on scene content. The inventor conducted experiments with an intensified video system to show excellent results using fixed values for parameters A and B. The experiments were conducted over a range of 10e-1 to 10e-6 foot-candles with a camera having a resolution of 1024×1280 pixels, mounted to a GEN III I² tube. The intensity is scaled to eight bits, providing a range of 0 to 255. Parameter A may be fixed at 127 (for example) and parameter B may be fixed at 96 (for example).

Although the aforementioned method of the invention effectively detects and suppresses scintillation noise in intensified digital video, it is not, by itself, sufficient. Whenever pixel substitution is used to reduce noise, false-positive artifacts may be produced. The manner in which persistent false-positive artifacts are reduced by the invention will now be described.

A pixel that abruptly increases in brightness within a single frame period, for example frame n (the present frame), is evaluated for substitution. If the brightness change satisfies the criteria given in Equation 1, the pixel from frame n is replaced using the pixel from frame n−1 (the previous frame).

Brightness increases not related to scintillation noise, typically, persist over multiple frames. If the increase continues into frame n+1 (the next frame), the scintillation test is repeated. Since frame n contains the pixel value from n−1, Equation 1 produces the same results for frame n+1. In this manner, the pixel value from frame n−1 is propagated forward indefinitely. This produces a dark artifact in a region that should appear bright. Persistent false-positive artifacts may be prevented, however, in one embodiment of the invention (described later with respect to FIG. 4), if the original pixel value $V_{p,f-1}$ is also remembered along with the substituted value $V'_{p,f-1}$. Then $V_{p,f-1}$ may be evaluated in Equation 1 instead of $V'_{p,f-1}$. If a pixel remains bright for two or more frames, $S_{p,f}$ would then be solved as being false, because $V_{p,f-1}$ is approximately equal to $V_{p,f}$.

Figure 3:
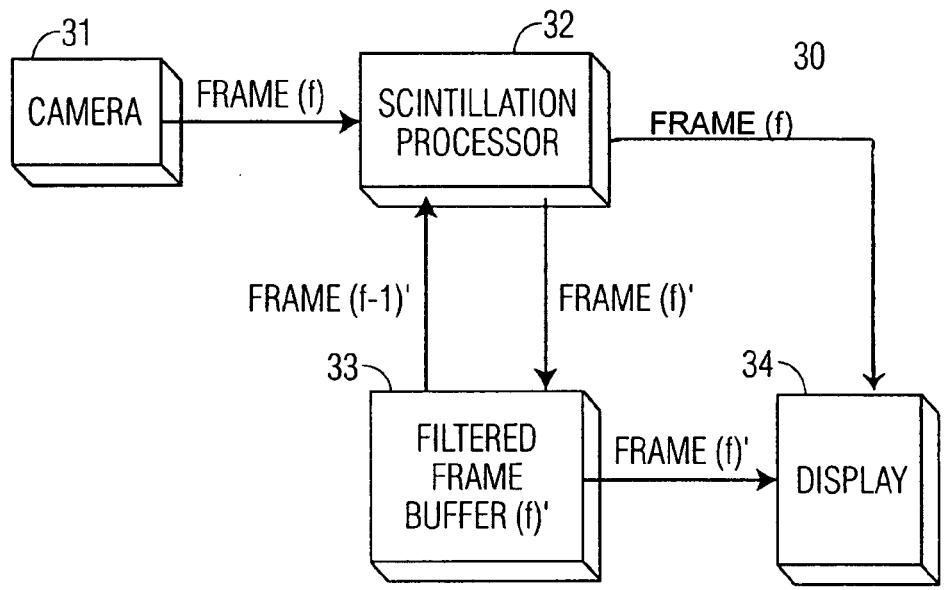
FIG. 3 is a block diagram depicting a system for suppressing noise scintillation occurring in a received frame of pixels, the frame received from a camera, in accordance with an embodiment of the invention.
Figure 4:
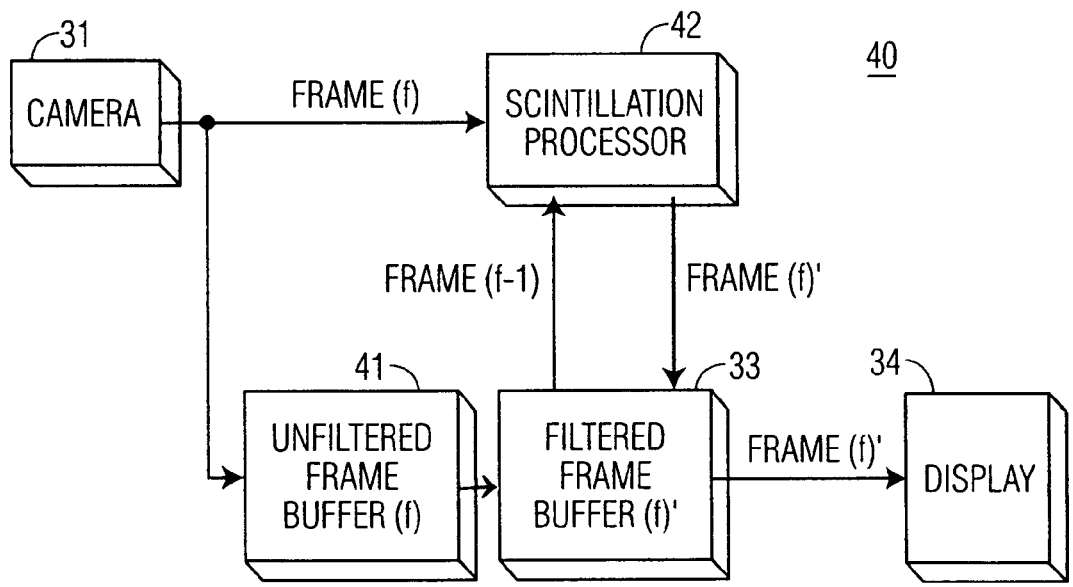
FIG. 4 is a block diagram depicting a system for suppressing noise scintillation occurring in a received frame of pixels, the frame received from a camera, in accordance with another embodiment of the invention.

This embodiment (as shown in FIG. 4), however, requires twice the system memory and bandwidth, because both $V_{p,f-1}$ and $V'_{p,f-1}$ must be remembered. The need for additional memory increases both cost and complexity. Another embodiment of the invention (shown in FIG. 3) will now be discussed that does not require additional memory and effectively corrects persistent false-positive artifacts, without a need for remembering $V_{p,f-1}$.

The number of scintillation noise events produced by an $I^2$ tube per unit time is random, having a Poisson distribution. The mean value of the number of scintillation events is highly correlated to the photo-multiplier tube gain. Thus, for a given tube gain, an embodiment of the present invention (shown in FIG. 3) estimates the number of scintillation events that may occur within one frame period. By counting the number of pixel substitutions performed during each frame, the invention determines if the number of substitutions exceeds an expected statistical value (or predetermined value).

The ratio of the number of substitutions to the number of total camera pixels is low for frames with low scene dynamics. If this ratio increases above a predetermined value, then it is likely that many false-positive pixel substitutions have occurred. By suspending all substitutions for one full frame, the invention allows all pixels to be refreshed with current scene data, and eliminates any persistent false-positive artifacts.

In operation, any pixel that abruptly and significantly increases in brightness may trigger pixel substitution. Events that may occur within a video image and cause abrupt and significant increases in brightness include a flash, a suddenly activated light source, an illuminated or highly reflective object moving into a scene, and a sudden increase in local scene luminance. An important difference, discovered by the inventor, between these types of scene changes and scintillation noise events is that scene changes tend to brighten a large number of pixels, whereas scintillation noise events only brightens a few pixels.

An $I^2$ tube, on the other hand, produces from 0 to a few hundred scintillations per camera frame, depending on the tube gain. If significantly more pixels are counted in frame (f) than predicted, then the probability of false-positives increases proportionally. As a result, the invention halts scintillation suppression on the next frame(f+1), and unfiltered incoming pixel data is placed into the video buffer, thereby overwriting previously stored pixel values. Scintillation suppression may then resume on subsequent frames, without propagating false-positives.

As an example, scintillation spikes within an $I^2$ tube, typically, subtend less than a 30 micron time period. This is equivalent to 9 pixels on a camera with a resolution of 1024×1280 pixels, mounted on a GEN III $I^2$ tube. Based on experimentation, the inventor discovered that, of these 9 pixels, only 4 or 5 may be bright enough to trigger substitution. Accordingly, if the $I^2$ tube produces two hundred scintillations per camera frame at high gain, then the reference camera may produce about a 1000 pixels passing the criteria of Equation 1. If significantly more than 1000 pixels are counted in frame(f), then the probability of false-positives is high.

The invention, therefore, sets the suspend-threshold for frame(f) equal to the number of pixels in frame(f−1) satisfying Equation 1 plus 10%. Then, an increase in brightness of 100 additional pixels in frame(f) with respect to frame (f−1) halts scintillation suppression on frame(f+1). It will be understood that the invention is not limited to this value (plus 10%) of the suspend-threshold, but other values are also contemplated by the invention. For example, plus 5% to plus 25% may also be used as a suspend-threshold.

Thus, any scene event that quantitatively brightens more than 100 pixels above a margin, for example, a 1000 pixels satisfying Equation 1, may result in the removal of persistent false-positive artifacts. Of course, for that frame, scintillation suppression is not performed. The size of the threshold margin determines the amount of scene dynamics allowed before scintillation suppression is reduced. It also determines the maximum number of false-positive artifacts allowed in the scene. By making the margin adjustable by a user, an optimal balance between scintillation and false-positive artifact noise may be obtained.

An algorithm for suppressing scintillation noise in 8-bit digital video is provided in the following table:

TABLE 1

An Exemplary Algorithm For Performing Scintillation Suppression

```
Set Current_substitution_count, Suspend_threshold = 0
Repeat forever
    Wait for start of frame(f)
    If Current_substitution_count>Suspend_threshold then
        suspended = true
    else
        suspended = false
    Suspend_threshold = Current_substitution_count + Margin
    Current_substitution_count = 0
    For p = 1 to Total_pixels loop
        If V_{p,f} > 127 and (V_{p,f-1}) > 64 then S_{p,f} = true
        If S_{p,f} = true then begin
            Current_substitution_count =
            Current_substitution_count + 1
            If not suspended then V'_{p,f} = V_{p,f-1}
        end if
    end loop
end repeat
```

Referring now to FIGS. 3 and 4, there are shown systems 30 and 40, respectively, suppressing scintillation noise from digital data produced by an intensified video camera. As shown in FIG. 3, intensified video camera 31 is coupled to scintillation processor 32 for providing a sequence of video frames for processing. Each frame provided by camera 31 is denoted as frame(f), the present frame. A frame buffer for storing a single frame, generally designated as 33, stores frame(f)', which represents the present frame after being filtered by scintillation processor 32. At the arrival of the next frame (shown as present frame(f) in FIG. 3) from camera 31, scintillation processor 32 receives the previously buffered filtered frame (f-1)' from filtered frame buffer 33. Accordingly, scintillation processor 32 compares the previously buffered filtered frame (f-1)' with the present camera frame(f). If Equation 1 is satisfied, on a pixel by pixel basis, and if suppression is not suspended in accordance with the algorithm listed in table 1, then a presently filtered frame(f)' is delivered to display 34, on a pixel by pixel basis. If, on the other hand, suppression is suspended due to an excessive amount of false-positives, then a presently unfiltered frame (f) is sent to display 34, on a pixel by pixel basis.

FIG. 4 depicts scintillation noise suppression system 40, having elements similar to elements shown in FIG. 3, namely camera 31, filtered frame buffer(f)' 33 and display 34. An additional buffer, namely unfiltered frame buffer(f) 41, is coupled between camera 31 and scintillation processor 42, as shown. The unfiltered frame buffer stores a present frame(f) arriving from camera 31.

At the arrival of the next frame (shown as present frame (f) in FIG. 4) from camera 31, scintillation processor 42 receives the previously buffered unfiltered frame(f-1) from frame buffer 41. Accordingly, scintillation processor 42 compares the previously buffered unfiltered frame(f-1) with the present camera frame(f). If Equation 1 is satisfied, on a pixel by pixel basis, then presently filtered frame(f)' is delivered to display 34, by way of filtered frame buffer 33, on a pixel by pixel basis.

The single buffer approach, shown in FIG. 3, has only one frame buffer. The scintillation processor has only the pre-filtered pixels from the previous buffered frame ($V'_{p,f-1}$) to compare against pixels from the present camera frame, ($V_{p,f}$). A false-positive becomes persistent, because the processor does not test against the unprocessed buffered camera data, but instead the processor tests against filtered data. The filtered pixel ($V'_{p,f-m}$) continues to be substituted as long as the camera pixel from the incoming frame is bright and satisfies the criteria for scintillation of Equation 1. Therefore, an algorithm, similar to that shown in table 1 for detecting and removing persistent false-positives is incorporated by the invention.

The dual buffer approach, shown in FIG. 4, however, stores both the filtered and the unfiltered pixel data from the current camera frame. The scintillation test may, thus, be made by the processor between the unfiltered pixels from the previous buffered frame ($V_{p,f-1}$) and pixels from the present camera frame, ($V_{p,f}$). Since the filtered data ($V'_{p,f-1}$) is not utilized in the scintillation test, false-positives are not propagated forward. They appear for a single frame and then are automatically over written. There is no need for further processing.

It will be appreciated that this invention is applicable to any system which makes use of intensified digital video in low light applications, especially when that system is limited to a single video frame buffer and/or has constraints on video data processing throughput.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for scintillation suppression of video images comprising the steps of:
   (a) receiving a frame of pixels having intensity values;
   (b) identifying pixels in the received frame having scintillation noise;
   (c) modifying intensity values of pixels in the received frame, identified as having scintillation noise, to form a filtered frame of pixels;
   (d) counting the number of pixels modified in step (c); and
   (e) displaying the filtered frame of pixels, if the amount of pixels counted is less than a threshold value;
   step (d) further includes the step of counting the number of pixels identified in the received frame having scintillation noise, and
   step (e) further includes the step of displaying the received frame, if the amount of pixels counted is greater than the threshold value.

2. The method of claim 1 further including the step of receiving previous and present frames of pixels, wherein
   step (c) further includes storing a previously filtered frame of pixels in a buffer, and
   modifying intensity values of pixels in the presently received frame of pixels by using the previously filtered frame of pixels stored in the buffer.

3. The method of claim 2 wherein modifying intensity values of pixels of the presently received frame of pixels further includes the step of:
   substituting a pixel at a two-dimensional location of the presently received frame of pixels with another pixel at the same two-dimensional the previously filtered frame of pixels.

4. The method of claim 3 wherein the substituting the pixel the of the presently received frame with the pixel of the previously recieved frame further includes the steps of:
   only substituting the pixel of the presently received frame, if the intensity value of the pixel is greater than a first predetermined threshold value.

5. The method of claim 4 wherein substituting the pixel of the presently received frame with the pixel of the previously received frame further includes the steps of:
   only substituting the pixel, if the difference between the intensity value of the pixel of the presently received frame and the intensity value of the pixel of the previously received frame is greater than a second predetermined threshold value.

6. The method of claim 5 including the step of:
   dynamically adjusting at least one of the first and second predetermined threshold values on a frame by frame basis.

7. The method of claim 5 including the step of:
   setting the first predetermined threshold value greater than the second predetermined threshold value.

8. The method of claim 1 further including the steps of:
   (f) setting a number of a suspension threshold;
   (g) comparing the number of the suspen threshold to the number of pixels counted in step (d); and
   (h) suspending step (c), if the number of pixels counted in step (d) is larger than the number of the suspension threshold.

9. The method of claim 8 wherein
   setting the number of the suspension threshold is based on an amount of scene dynamics in the received frame of pixels.

10. The method of claim 8 further including the step of recieving previous frames of pixels, wherein
   setting the number of the suspension threshold is based on an amount of pixels of the previously received frame, modified in step (c), plus approximately 10% of the number of pixels substituted.

11. The method of claim 10 further including the step of:
   storing a previously filtered frame of pixels in a buffer, and
   step (e) includes displaying the previously filtered frame of pixels stored in the buffer, if step (h) suspends step (c).

12. A system for scintillation suppression comprising
   a receiver for receiving a frame of pixels having intensity values,
   a processor, coupled to the receiver, for
      (a) identifying pixels in the received frame having scintillation noise, and
      (b) modifying intensity values of pixels in the received frame identified as having scintillation noise, to form a filtered frame of pixels,
   a counter, included in the processor, for counting the number of pixels modified by the processor in the filtered frame of the pixels, and
   a display for displaying the filtered frame of pixels formed by the processor,
   wherein the display displays the filtered frame of pixels, if the amount of pixels counted by the counter is less than a threshold value, and
   the display displays the recieved frame, if the amount of pixels counted by the counter is greater than the threshold value.

13. The system of claim 12 wherein
   the receiver is configured to receive previous and present frames of pixels,
   a first buffer is coupled to the processor for storing a previously filtered frame of pixels, and
   the processor is configured to modify intensity values of a presently received frame of pixels based on the previously filtered frame of pixels stored in the first buffer.

14. The system of claim 13 wherein
   the processor is configured to substitute a pixel at a two-dimensional location of the presently received frame of pixels with another pixel at the same two-dimensional location of the previously filtered frame of pixels.

15. The system of claim 14 wherein
   the processor is configured to only substitute the pixel of the presently received frame, if the intensity value of the pixel is greater than a first predetermined threshold value.

16. The system of claim 14 wherein
   the processor is configured to only substitute the pixel, if the difference between the intensity value of the pixel of the presently received frame and the intensity value of the pixel of the previously received frame is greater than a second predetermined threshold value.

17. The system of claim 14 wherein
   the processor includes a suspension threshold number, and
   a comparator for comparing the number of pixels substituted by the processor in the presently filtered frame of pixels with the suspend threshold number, and
   the processor suspending the modification of intensity values of pixels in the presently received frame, if the comparator determines that the number of pixels substituted by the processor in the presently filtered frame of pixels is larger than the suspend threshold number.

18. The system of claim 17 wherein
   the suspension threshold number is based on the number of pixels substituted in a previously filtered frame plus approximatly 10% of the number of pixels substituted.

19. The system of claim 13 wherein
   a second buffer is coupled to the processor for storing a previously received frame of pixels, in which the pixels are free-of any modification by the processor, and
   the processor is configured to modify the presently received frame of pixels based on the previously received frame of pixels stored in the second buffer.

* * * * *